US006692723B2

(12) United States Patent
Rouleau et al.

(10) Patent No.: US 6,692,723 B2
(45) Date of Patent: Feb. 17, 2004

(54) MTT ZEOLITE COMPRISING CRYSTALS AND CRYSTAL AGGREGATES WITH SPECIFIC GRANULOMETRIES, AND ITS USE AS A CATALYST FOR ISOMERIZING STRAIGHT CHAIN PARAFFINS

(75) Inventors: Loïc Rouleau, Oullins (FR); Frédéric Kolenda, Francheville (FR); Eric Benazzi, Chatou (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 367 days.

(21) Appl. No.: 09/788,480

(22) Filed: Feb. 21, 2001

(65) Prior Publication Data
US 2002/0192156 A1 Dec. 19, 2002

(30) Foreign Application Priority Data
Feb. 21, 2000 (FR) .............................. 00 02147

(51) Int. Cl.⁷ .................. C01B 39/04; B01J 29/72; C07C 5/22
(52) U.S. Cl. .................. 423/716; 423/708; 423/709; 423/717; 423/DIG. 36; 502/66; 502/74; 585/739; 585/750
(58) Field of Search ................ 423/700, 708, 423/716, DIG. 36, 717; 502/66, 74; 585/739, 750

(56) References Cited

U.S. PATENT DOCUMENTS

| 4,619,820 A | * | 10/1986 | Valyocsik |
| 4,929,790 A | * | 5/1990 | Kaeding et al. |
| 5,063,038 A | * | 11/1991 | Kirker et al. |
| 5,233,112 A | | 8/1993 | Marler et al. |
| 6,099,820 A | * | 8/2000 | Miller ............ 423/700 |

FOREIGN PATENT DOCUMENTS

| EP | 0 306 181 | 3/1989 |
| EP | 0 449 144 A2 | 10/1991 |
| EP | 0 462 681 A1 | 12/1991 |
| WO | WO 98/16469 | 4/1998 |

* cited by examiner

Primary Examiner—David Sample
(74) Attorney, Agent, or Firm—Millen, White, Zelano & Branigan, P.C.

(57) ABSTRACT

The invention concerns a zeolite with structure type MTT comprising MTT zeolite crystals with a size of less than 5 μm, at least a portion of the MTT zeolite crystals being in the form of MTT zeolite crystal aggregates, said zeolite being characterized in that the granulometry of the aggregates is such that the dimension Dv,90 is in the range 40 nm to 100 μm. The invention also concerns the preparation of the zeolite and the use of the zeolite as a catalyst in a process for converting hydrocarbon feeds, and in particular in a process for isomerizing straight chain paraffins.

24 Claims, No Drawings

MTT ZEOLITE COMPRISING CRYSTALS AND CRYSTAL AGGREGATES WITH SPECIFIC GRANULOMETRIES, AND ITS USE AS A CATALYST FOR ISOMERIZING STRAIGHT CHAIN PARAFFINS

The present invention relates to a zeolite with structure type MTT in the form of crystals and crystal aggregates with a specific ganulometry and to a catalyst comprising such a zeolite. The present invention also relates to the use of said catalyst in the principal transformation processes used in refining, in particular in straight chain paraffin isomerisation processes intended to improve the quality of such paraffin fractions for upgrading them, in particular into vehicle fuels. To this end, the isomerisation reaction can transform straight chain paraffinic hydrocarbons (normal paraffins, nP) with low octane numbers into branched hydrocarbons from the same family (isoparaffins, iP) with much higher octane numbers.

The isomerisation reaction leads to secondary reactions, coking and cracking, and conventional catalysts used to carry out such a reaction, namely bifunctional catalysts generally comprising an acid function and a hydrodehydrogenating function, lack selectivity for isoparaffins to the advantage of the secondary reactions cited above that constitute substantial losses for the desired reaction.

Further, in order to minimize secondary reactions, the Applicant has studied the synthesis of novel bifunctional zeolitic catalysts that are more active and more selective for converting straight chain paraffffins than known catalysts.

In particular, the physical characteristics inherent in the catalyst have been studied and it has been discovered that the crystal size, and more precisely the size of the aggregates formed by the crystals of the zeolite comprised in said catalyst, have a major influence on paraffin hydrocarbon transformation catalytic performance in terms of activity and selectivity.

Zeolites with a specific granulometry have already been described in the prior art. As an example, European patent application EP-A2-0 323 893 describes an L zeolite that can be used to convert hydrocarbon feeds, which possesses aggregates of crystals with a length in the range 0.50 to 1.50 $\mu$m and with a diameter in the range 0.2 to 0.6 $\mu$m. That patent discloses that the aggregate size depends on the alkalinity of the reaction mixture during preparation of the zeolite. In their International patent application WO-A-93/25476, Verduijn et al. describe a ZSM-5 zeolite comprising aggregates in the form of needles with a maximum average length of 10 $\mu$m, obtained by controlling parameters such as the crystallization temperature or alkalinity of the reaction mixture. Other authors (WO-A-93/08125) also suggest controlling the crystal and aggregate size of a molecular sieve formed from an MFI, MEL or $\beta$ type zeolite by means of the crystallisation temperature. It should be noted that these prior art patent application never mention the specific size of the crystals and aggregates in combination with particular catalytic properties.

The Applicant has made significant progress by developing a catalyst containing a zeolite with structure type MTT, in particular ZSM-23 zeolite, having well defined crystal and crystal aggregate sizes, so as t reduce by a maximum the formation of undesirable cracking products and coke during isomerisation reactions.

ZSM-23 zeolite with structure type MTT, which has already been described in the prior art, has a unidimensional microporous framework, with a pore diameter of 4.5×5.2 Å (1 Å×1 Angstrom=1×10$^{-10}$ m) ("Atlas of Zeolite Structure Types", W. M. Meier and D. H. Olson, 4$^{th}$ edition, 1996) Further, A. C. Rohmann et al (Zeolite, 5, 352, 1985).J. L. Schenker et al (private communication, 1992) and B. Marler et al (J. Appl. Cryst. 26, 636, 1993) have stated that the crystalline lattice has orthorhombic symmetry (Pmn2$_1$, a=21.5 Å, b=11.1 Å, c=5.0 Å)with channels parallel to axis c, delimited by rings of 10 tetrahedra. The synthesis mode and physico-chemical characteristics of ZSM-23 zeolite have been described in a variety of patents which differ in the nature of the organic template used. That zeolite can be synthesised using pyrrolidine U.S. Pat. No. 4,076,842), diisopropanolamine (British patent GB-A-2 190 910), quaternary ammonium compounds such as heptamethonium bromide (U.S. Pat. No. 5 405 596) octamethonium bromide (GB-A-2 202 838) dodecamethonium bromide (U.S. Pat. No. 5 405 596) and quaternary triammonium compounds (U.S. Pat. No. 5,332,566) The mode of synthesis compries mixing an oxide, generally a silicon oxide, and an oxide, generally an aluminium oxide, in the presence of the template.

Other zeolite structure type MTT and differ from ZSM-23 zeolite in the mode of preparation, in particular in the organic template used. These are EU-13 zeolite (European patent EP-A-0 108 486), using a quaternary methylated ammomium or phosphonium salt, ISI-4 zeolite (EP-A- 0 102 497) using ethylene glycol or a monoethanolamine, SSZ-32 zeolite (U.S. Pat. No. 4 483 835) using imidazole derivatives or KZ-1 zeolite using a variety of amines (L. M. Parker et al, Zeolite, 3,8, 1988)

SUMMARY OF THE INVENTION

The present invention concerns a zeolite with structure type MTT comprising MTT zeolite crystals with a size of less than 5 $\mu$m, at least a portion of the MTT zeolite crystals being in the form of MTT zeolite crystal aggregates, said aggregates having a granulometry such that the dimension Dv,90 is in the range 40 nm to 100 $\mu$m. More particularly, the invention concerns ZSM-23 zeolite with structure type MTT, and its use as an acidic solid in the composition of a catalyst for isomerising light straight chain paraffins.

IMPORTANCE OF THE INVENTION

MTT zeolite, for example ZSM-23 zeolite as defined in the present invention, used as a catalyst in association with at least one binder, at least one metal selected from elements from group VIII of the periodic table, has improved catalytic performances for hydrocarbon transformations in terms of activity and selectivity, such as isomerising light paraffinic hydrocarbons containing 5 to 10 carbon atoms per molecule.

DESCRIPTION OF THE INVENTION

The zeolite with structure type MTT of the invention comprises crystals of MTT zeolite wherein at least a portion is in the form of aggregates of MTT zeolite. The zeolite with structure type MTT of the invention can be ZSM-23 zeolite, EU-13 zeolite, ISI-14 zeolite or KZ-1 zeolite.

Throughout the remaining text, the term "aggregate" as used in the present invention means an ensemble formed from at least two zeolite crystals having at least one mutual point of contact. The granulometry of the crystal aggregates is represented by the dimension Dv,X, defined as the diameter of the equivalent sphere such that the size of X% by volume of aggregates is less than said diameter.

The zeolite with structure type MTT of the invention is characterized in that the size of the MTT zeolite crystals is less than 5 $\mu$m, limits included, at least a portion of the zeolite crystals being collected into aggregates, said crystal aggregates being characterized in that their granulometry is such that the dimension Dv,90 is in the range 40 nm to 100 μm.

The zeolite with structure type MTT of the present invention generally has the following formula in its anhydrous form 0 to $20R_{2/n}O$; 0–10 $T_2O_3$: 100 $XO_2$, where R represents a cation with valency n, X represents silica and/or germanium, T represents at least one element selected from aluminium, iron, gallium, boron, titanium, vanadium, zirconium, molybdenum, arsenic, antimony, chromium and manganese, the overall atomic ratio X/T being 5 or more and preferably more than 10.

The crystal size is determined by X ray diffraction and/or using an electron microscope. The aggregate size is determined by laser diffraction granulometry and/or by electron microscopy. The granulometry is measured by laser diffraction using the zeolite suspended in water. The size distribution of the aggregates, defined by volume, is calculated from light signals collected by detectors and applying the Fraunhofer theory. The granulometric characteristics of the zeolite with structure type MTT are advantageously obtained directly during synthesis of the zeolite. They can also be obtained using any method that can reduce the aggregate size after synthesis such as grinding, for example, or by adapting the forming conditions, for example the mixing conditions during extrusion.

Preferably, the MTT zeolite crystal size is less than 2 μm. More preferably, it is less than 0.5 μm and preferably less than 0.2 μm. The granulometry of the crystal aggregates is such that the dimension Dv,90 is preferably in the range 40 nm to 80 μm. In particular, Dv,90 is generally in the range 40 nm to 60 μm, more advantageously Dv,90 is in the range 40 nm to 40 μm.

The zeolite with structure type MTT of the invention is obtained, for example, using a preparation process comprising reacting an aqueous mixture with at least one source of at least one element X selected from silicon and germanium, at least one source of at least one element T selected from aluminium, iron, gallium, boron, titanium, vanadium, zirconium, molybdenum, arsenic, antimony, chromium and manganese, at least one nitrogen-containing organic compound Q acting as a template selected from alkylated polymethylene α-ω diammonium salt derivatives and precursors of said derivatives. The mixture is reacted until the zeolite crystallises. The alkylated polymethylene α-ω diammonium derivative, used in particular for synthesising ZSM-23 zeolite, is defined by the formula $R_1R_2R_3N^+(CH_2)_nN^+R_4R_5R_6$, n being in the range 3 to 14 and $R_1$ To $R_6$, which may be identical or different, representing alkyl or hydroxyalkyl radicals containing 1 to 8 carbon atoms; up to five $R_1$ to $R_1$ radicals can be hydrogen In a first mode for preparing the MTT zeolite of the invention, the zeolite crystal and crystal aggregate size is monitored during synthesis and depends on the set of crystallisation processes which are controlled by the synthesis parameters. More particularly, these parameters include supersaturation (reactant concentration), pH (alkalinity), ionic strength (adding salts), addition of solid seeds, the temperature profile and the characteristics of mixing and stirring.

Regarding controlling the crystal and crystal aggregate size by the rate of stirring applied in the reactor, it is advantageous to apply at least two substantially different successive stirring rates to the mixture. Preferably, stirring is carried out at a first stir rate then at a second stir rate which is substantially higher than the first stir rate. Thus, for example, the second stir rate is at least 5% higher than the first stir rate. More preferably, it is at least 20% higher than the first stir rate, more preferably at least 50% higher than the first stir rate. The time during which stirring is carried out by applying the first stir rate advantageously represents 90% of the total stirring time, more advantageously 95% of the total stirring time. Clearly, the type of reactor used to carry out the preparation of the zeolite of the invention defines the stirring rate to be applied to obtain the desired crystal and crystal aggregate size Further, the power dissipated by stirring and the volume of the reactor must be taken into consideration when selecting a suitable stirring rate.

In a particular implementation, the process for preparing the zeolite of the invention comprises introducing during synthesis seeds S of at least one zeolite which is identical to or different from the MTT zeolite. In general, the seed particle size must be calibrated to between 0.005 and 500 μm, preferably in the range 0.01 to 40 μm Thus seeds of at least one zeolite, for example with structure type LTA, LTL, FAU, MOR, MAZ, OFF, FER, ERI, BEA, MFI, MTW, EUO, LEV, TON and NES, IM-5 or a NU-85, NU-86, NU-88 zeolite or a zeolite with structure type MTT can be used. Preferably, the seeds used are constituted by seeds of at least one zeolite with structure type LTA, FAU, MOR, MFI or MTT. In a preferred implementation, the seeds are different from the MTT zeolite of the invention in their structure type or in the chemical composition of the crystalline framework.

The seeds S are introduced directly after their synthesis or after having undergone at least one of the steps selected from the following post synthesis steps: washing, drying, calcining and ion exchange. Seeds can be introduced at any point in the preparation of the MTT zeolite. The seeds can be introduced at the same time as the sources of the metal oxides based on elements X and T, the organic template, or its precursors. Preferably, the seeds are introduced after at least partial homogenisation of the aqueous mixture containing the metal oxide precursors based on elements X and T and the template or template precursor.

When preparing a material with structure type MTT that is, for example, ZSM-23 zeolite, the alkylated polymethylene α-ω diammonium derivatives used as an organic template include alkylated derivatives of heptamethylene α-ω-diammonium, octamethylene αω-diammonium, undecamethylene α-ω diammonium, dodecamethylene α-ω-diammonium and especially methylated derivatives heptamethylene α-ω diammonium, octamethylene α-ω diammonium, undecamethylene α-ω diammonium, dodecamethylene α-ωdiammonium derivatives, more preferably still 1,7-N,N,N,N',N',N',-hexamethylheptamethylene α-ω diammonium salts, 1,8-N,N,N,N',N',N',-hexamethyloctamethylene α-ω diammonium salts, 1,11-N, N,N,N',N',N', -hexamethylundecamethylene α-ω diammonium salts, 1,12-N,N,N,N',N',N',-hexamethyldodecamethylene α-ω diammonium salts, for example the halide, hydroxide, sulphate, silicate or aluminate. The alkylated polymethylene α-ω diammonium derivatives can be obtained from precursors. Suitable precursors of the starting alkylated polymethylene α-ω diammonium derivatives are in particular the related diamines together with alcohols, alkyl halides, alkanediols or the related alkane dihalides together with alkylamines, preferably trialkylamines. They can be used in situ or they can be preheated together in the reaction vessel, preferably in solution before adding the other reactants necessary for synthesis of the ZSM-23 zeolite.

In one particular implementation of the process for preparing the zeolite of the invention, independent or otherwise of the preceding implementations, it may be advantageous to add at least one alkali metal or ammonium salt P to the reaction medium. Examples which can be cited are strong acid radicals such as bromide, chloride, iodide, sulphate, phosphate or nitrate, or weak acid radicals such as organic acid radicals, for example citrate or acetate. This salt can accelerate crystallisation of zeolites with structure type MTT, for example ZSM-23 zeolite, from the reaction mixture and it can affect the size and shape of the crystals of said zeolites.

In accordance with the process for preparing the MTT zeolite of the invention, and more particularly ZSM-23 zeolite, the reaction mixture for synthesising said zeolite with structure type MTT advantageously has the following composition, expressed in the oxide form.

| | |
|---|---|
| $XO_2/T_2O_3$ | at least 10 |
| $OH^-/XO_2$ | 0.002 to 2.0 |
| $Q/XO_2$ | 0.002 to 2.0 |
| $Q/(M^+ + Q)$ | 0.1 to 1.0 |
| $H_2O/XO_2$ | 1 to 500 |
| $P/XO_2$ | 0 to 5 |
| $S/XO_2$ | 0 to 0.1 |

Preferably, the reaction mixture has the following composition, expressed in the oxide form:

| | |
|---|---|
| $XO_2/T_2O_3$ (mol/mol) | at least 12 |
| $OH^-/XO_2$ (mol/mol) | 0.005 to 1.5 |
| $Q/XO_2$ (mol/mol) | 0.005 to 1.5 |
| $Q/(M^{30} + Q)$ (mol/mol) | 0.1 to 1.0 |
| $H_2O/XO_2$ (mol/mol) | 3 to 250 |
| $P/XO_2$ (mol/mol) | 0 to 1 |
| $S/XO_2$ (g/g) | 0 to 0.07 | and still more preferably, the reaction mixture has the following composition, expressed in the oxide form

| | |
|---|---|
| $XO_2/T_2O_3$ (mol/mol) | at least 15 |
| $OH^-/XO_2$ (mol/mol) | 0.01 to 1 |
| $Q/XO_2$ (mol/mol) | 0.01 to 1 |
| $Q/(M^{30} + Q)$ (mol/mol) | 0.1 to 1.0 |
| $H_2O/XO_2$ (mol/mol) | 5 to 100 |
| $P/XO_2$ (mol/mol) | 0 to 0.25 |
| $S/XO_2$ (g/g) | 0 to 0.04 | where

X is silicon and/or germanium. Preferably, X is silicon.

T is at least one element selected from aluminium, iron, gallium, boron, titanium, vanadium, zirconium, molybdenum, arsenic, antimony, chromium and manganese Preferably, T is aluminium.

M represents an alkali metal or an ammonium ion. Preferably, M is sodium.

Q represents the organic template or precursors of said template;

S represents zeolite seeds expressed in their dried, calcined or exchanged form.

P represents the alkali metal or ammonium salt.

M and/or Q can be present in the form of hydroxides or salts of inorganic or organic acids provided that the $OH^-/XO_2$ criterion is satisfied.

The reaction mixture is normally caused to react under autogenous pressure, optionally adding a gas, for example nitrogen, at a temperature in the range 85° C. to 250° C. until zeolite crystals with structure type MTT form, which can take from 1 minute to several months depending on the reactant composition, the mode of heating and the mixture, the working temperature and the degree of stirring.

When the reaction is over, the solid phase is collected on a filter and washed and is then ready for subsequent operations such as drying, calcining and ion exchange.

The silicon source can be any one in normal use envisaged for zeolite synthesis, for example solid powdered silica, silicic acid, colloidal silica or dissolved silica Powdered silicas which can be used include precipitated silicas, in particular those obtained by precipitation from a solution of an alkali metal silicate such as ZEOSIL or TIXOSIL produced by Rhône-Poulenc, fumed silicas such as aerosils produced by Degussa and "Cabosil" produced by Cabot, and silica gels. Colloidal silicas with a variety of granulometries can be used, such as those sold under trade marks "LUDOX" from Dupont, and "SYTON" from Monsanto.

Particular dissolved silicas which can be used are commercially available soluble glasses or silicates containing 0.5 to 6.0 and in particular 2.0 to 4.0 moles of $SiO_2$ per mole of alkali metal oxide and silicates obtained by dissolving silica in an alkali metal hydroxide, a quaternary ammonium hydroxide or a mixture thereof.

More advantageously, the aluminium source is sodium aluminate, but it can also be aluminium, an aluminium salt, for example a chloride, nitrate or sulphate, an aluminium alcoholate or alumina itself which should preferably be in a hydrated or hydratable form, such as colloidal alumina, pseudoboehmite, boehmite, gamma alumina or an alpha or beta trihydrate. Mixtures of the sources cited above can be used. Combined sources of silicon and aluminium can also be used, such as amorphous silica-aluminas or certain clays.

To obtain the hydrogen form of the MTT zeolite of the invention, ion exchange can be carried out using an acid, in particular a strong mineral acid such as hydrochloric, sulphuric or nitric acid, or with an ammonium compound such as an ammonium salt, for example ammonium chloride, sulphate or nitrate. Ion exchange can be carried out by diluting once or more times with the ion exchange solution The zeolite can be calcined before or after ion exchange or between two ion exchange steps, preferably before ion exchange to eliminate all absorbed organic substances, provided that ion exchange is thereby facilitated.

As a general rule, the cation or cations of the zeolite with structure type MTT can be replaced by one or more cations of any metal, in particular those from groups IA, IB, IIA, IIB, IIIA and IIIB (including the rare earths), VIII (including the noble metals), also lead, tin and bismuth (the periodic table is that shown in the "Handbook of Physics and Chemistry", $76^{th}$ edition). Exchange is carried out using any water-soluble salt containing the appropriate cation.

In a further mode for preparing the zeolite of the invention, independent or otherwise of the preceding preparation modes, the zeolite of the invention is obtained by post-synthesis grinding. This grinding is carried out on a zeolite with an aggregate Dv,90 of more than 100 μm. Any grinding technique which is known to the skilled person is suitable. This grinding can be carried out on an as synthesised zeolite, before or after calcining or after cation exchange, using a dry or wet procedure provided that grinding does not affect the crystallinity of the zeolite.

In a further mode for preparing the zeolite of the invention, which is independent or otherwise of the preceding modes, the crystal aggregate size of the MTT zeolite can be controlled by adjusting the forming conditions, for example the mixing conditions during extrusion.

The present invention also concerns the use of the zeolite prepared using the process of the present invention as an adsorbent to control pollution, as a molecular sieve for separation and as an acidic solid for catalysis in the fields of refining and petrochemistry.

As an example, when it is used as a catalyst, the MTT zeolite can be associated with an inorganic matrix which can be inert or catalytically active, and with an active phase The inorganic matrix can be present simply as a binder to keep the small particles of zeolite together in the different known forms of catalysts (extrudates, beads, powders, pellets), or it can be added as a diluent to impose a degree of conversion on a process which would otherwise proceed at too high a rate leading to clogging of the catalyst as a result of increased coke formation. Typical inorganic diluents are support materials for catalysts such as silica, the different forms of alumina and kaolinic clays, bentonites, montmorillonites, sepiolite, attapulgite, fuller's earth, synthetic porous materials such as $SiO_2$—$Al_2O_3$, $SiO_2$—$ZrO_2$, $SiO_2$—$ThO_2$, $SiO_2$—$BeO$, $SiO_2$—$TiO_2$ or any combination of these compounds. Said inorganic matrix can be a mixture of different compounds, in particular of an inert phase and a catalytically active phase.

Said metallic phase with which the zeolite can be associated is introduced into the zeolite alone, the inorganic matrix alone or into the inorganic matrix-zeolite ensemble, by ion exchange or impregnation with cations or oxides selected from the following. Cu, Ag, Ga, Mg, Ca, Sr, Zn, Cd, B, Al, Sn, Pb, V, P, Sb, Cr, Mo, W, Mn, Re, Fe, Co, Ni, Pt, Pd, Ru, Rh, Os, Ir and any other element from the periodic table.

The zeolite with structure type MTT of the invention can also be associated with at least one other zeolite and act as the principal active phase or as the additive.

In a further mode for preparing the zeolite of the invention, which may or may not be independent of the preceding implementations, the size of the crystal aggregates can be controlled by adapting the dispersion conditions for the different ingredients forming the apparatus of the catalyst prior to forming.

Catalytic compositions comprising the zeolite with structure type MTT can be applied to isomerisation, transalkylation and dismutation, alkylation and dealkylation, hydration and dehydration, oligomerisation and polymerisation, cyclisation, aromatisation, cracking and hydrocracking, reforming, hydrogenation and dehydrogenation, oxidation, halogenation, amine synthesis, hydrodesulphurisation and hydrodenitrogenation, catalytic elimination of oxides of nitrogen, ether formation and hydrocarbon conversion and to the synthesis of organic compounds in general. these reactions involving saturated and unsaturated aliphatic hydrocarbons, aromatic hydrocarbons, oxygen-containing organic compounds and organic compounds containing nitrogen and/or sulphur, also organic compounds containing other functional groups.

More particularly, the invention concerns the use of a zeolite with structure type MTT of the present invention as an acid component of a bifunctional zeolitic catalyst for isomerising straight chain paraffins containing 5 to 10 carbon atoms.

The catalyst of the invention can be used in any process for isomerisation (or hydroisomerisation) of $C_5$–$C_{10}$ paraffins, preferably $C_7$–$C_{10}$, more preferably $C_7$–$C_9$ and still more preferably $C_7$–$C_8$. The catalyst of the invention is particularly suitable for a process for preparing gasoline with a high octane number, combining catalytic isomerisation and separation. More particularly, it is suitable for the process described in French patent application FR-B-2 771 419, which comprises an isomerisation section and at least one section for separating dibranched and tribranched paraffins.

The formed catalyst of the present invention contains:

at least one zeolite with structure type MTT, for example ZSM-23 zeolite, characterized by a crystal and crystal aggregate granulometry such that the size of the MTT zeolite crystals is less than 5 $\mu$m, preferably less than 2 $\mu$m, more preferably less than 0.5 $\mu$m, and still more preferably less than 0.2 $\mu$m and the Dv,90 of the crystal aggregates is in the range 40 nm to 100 $\mu$m, preferably in the range 40 nm to 80 $\mu$m, more preferably in the range 40 nm to 60 $\mu$m, and still more preferably in the range 40 nm to 40 $\mu$m;

at least one hydrodehydrogenating function, at least one matrix.

More precisely, the MTT zeolite based catalyst of the invention contains at least one matrix in an amount in the range 1% to 90%, preferably in the range 5% to 90%, more preferably in the range 10% to 85%. Examples of matrices used to form the catalyst are generally selected from alumina gel, alumina, magnesia, amorphous silica-alumina, and mixtures thereof. Techniques such as extrusion, pelletisation or bowl granulation can be employed to carry out the forming operation.

The hydrodehydrogenating function is ensured, for example, by at least one element from group VIII of the periodic table, preferably at least one noble element selected from the group formed by platinum and palladium. The quantity of noble group VIII metal with respect to the final catalyst is preferably less than 5%, more preferably less than 3% and still more preferably less than 1.5%. It is also possible to use at least one non noble metal from group VIII. The amount of said non noble metal from group VIII with respect to the finished catalyst is advantageously in the range 1% to 40% by weight, more advantageously in the range 10% to 30% Advantageously, the non noble metal is associated with a group VIB metal (preferably Mo or W).

Isomerisation (hydroisomerisation) is carried out in at least one reactor. The temperature is in the range 150° C. to 350° C., preferably in the range 200° C. to 300° C., and the partial pressure of hydrogen is in the range 0.1 to 7 MPa, preferably in the range 0.5 to 5 MPa The space velocity is in the range 0.2 to 10 liters of liquid hydrocarbons per liter of catalyst per hour, preferably in the range 0.5 to 5 liters of liquid hydrocarbons per liter of catalyst per hour. The hydrogen/feed mole ratio at the reactor inlet is such that the hydrogen/feed mole ratio in the effluent leaving the reactor is generally more than 0 01, preferably in the range 0 01 to 50, more preferably in the range 0.06 to 20.

The following examples illustrate the invention more precisely without in any way limiting its scope.

EXAMPLE 1 (COMPARATIVE)

ZSM-23 Zeolite with Structure Type MTT with Crystal Aggregate Sizes that are not in Accordance with the Invention.

The synthesis mixture had the following composition:

| | |
|---|---|
| $SiO_2$ (mol) | 60 |
| $Al_2O_3$ (mol) | 1.5 |
| $Na_2O$ (mol) | 9 |
| $OctaBr_2^{(1)}$ (mol) | 10 |
| $H_2O$ (mol) | 3000 |

$^{(1)}$octamethonium bromide = $Me_3N(CH_2)_8NMe_3^{2+}(Br^-)_2$

A solution A composed of silica and template was prepared by diluting octamethonium bromide (Fluka. 97%) in 80% of the water necessary to form a gel then adding colloidal silica sol (Ludox HS40 Dupont, 40% $SiO_2$) Solid sodium hydroxide (Prolabo, 99%) and solid sodium aluminate (Prolabo, 46% $Al_2O_3$, 33% $Na_2O$) were then dissolved in 10% of the water necessary to form a gel to form a solution B. Solution B was added to solution A with stirring, then the remaining water (10%). Mixing was carried out until the medium was homogeneous The resulting mixture was reacted in a 125 ml autoclave with stirring at 180° C. under autogenous pressure, until the zeolite crystallised After cooling, the product was filtered and washed with 0.5 liters of demineralised water then dried in a ventilated oven at 120° C.

The results of X ray diffraction and chemical analysis are shown in following table:

| | |
|---|---|
| Time (d) | 12.0 |
| ZSM-23[1] (%) | 100 |
| Si/Al[2] (mol/mol) | 18.9 |
| Production[5] (%) | 4.7 |
| Crystal size[3] (nm) | 20–100 |
| $D_{v90}$[4] (μm) | 160 |

[1]Determined by X ray diffraction
[2]Determined by X ray fluorescence
[3]Determined by the Scherrer relationship from the peak width between $2\theta$ = 7 to 35°
[4]Determined by laser diffraction granulometry
[5]Production (%) corresponds to the mass of dried solid, recovered following synthesis, with respect to the total mass used initially in the gel.

Synthesis produced a ZSM-23 zeolite with a Si/Al ratio of 18.9, with optimum crystallinity and production (100% and 4.7% respectively). The zeolite was in the form of 20 to 100 nm crystallites associated into aggregates wherein Dv,90 was 160 μm

EXAMPLE 2 (INVENTION)

ZSM-23 Zeolite with Structure Type MTT with Crystallite Aggregate Sizes in Accordance with the Invention, Obtained by Grinding The zeolite from Example 1 was ground.

The results of X ray diffraction and granulometry are shown in the following table:

| | |
|---|---|
| ZSM-23[1] (%) | 101 |
| Crystal size[2] (nm) | 20–100 |
| $D_{v90}$[3] (μm) | 22 |

[1]Determined by X ray diffraction, with reference to Example 1
[2]Determined by the Scherrer relationship from the peak width between $2\theta$ = 7 to 35°
[3]Determined by laser diffraction granulometry.

The crystallinity and size of the zeolite crystallites was not modified by grinding (respectively 100% and size in the range 20–100 nm).

The size of the aggregates was substantially reduced by grinding, which generated crystal aggregates with a Dv,90 of 22 μm.

EXAMPLES 3 TO 6 (INVENTION)

ZSM-23 Zeolites with Structure Type MTT with Crystal Aggregate Sizes in Accordance with the Invention Obtained Directly by Synthesis.

The synthesis mixture had the following composition:

| Example | 3 | 4 | 5 | 6 |
|---|---|---|---|---|
| $SiO_2$ (mol) | 60 | 60 | 60 | 60 |
| $Al_2O_3$ (mol) | 1.5 | 1.5 | 1.5 | 1.5 |
| $Na_2O$ (mol) | 9 | 9 | 9 | 9 |
| $OctaBr_2$[1] (mol) | 10 | 10 | 0 | 0 |
| DBO[2] (mol) | 0 | 0 | 10 | 10 |
| TMA[3] (mol) | 0 | 0 | 20 | 20 |
| $H_2O$ (mol) | 3000 | 3000 | 3000 | 3000 |
| ZSM-23[4] (%) | 0 | 4 | 0 | 4 |

[1]octamethonium bromide = $Me_3N(CH_2)_8NMe_3^{2+}(Br^-)_2$
[2]dibromooctane
[3]trimethylamine
[4]with respect to silica.

A solution A composed of silica and template was prepared by diluting octamethonium bromide (Fluka, 97%) or its precursors, dibromooctane (Acros, 99%) and an aqueous trimethylamine solution (Acros, 45%) in 80% of the water necessary to form a gel then adding colloidal silica sol (Ludox HS40, Dupont, 40% $SiO_2$) Solid sodium hydroxide (Prolabo, 99%) and solid sodium aluminate (Prolabo, 46% $Al_2O_3$, 33% $Na_2O$) were then dissolved in 10% of the water necessary to form a gel to form a solution B. Solution B was added to solution A with stirring, followed by the remaining water (10%). Mixing was carried out until the medium was homogeneous and then if required, ZSM-23 zeolite seeds (examples 4 and 6) were added. The resulting mixture was reacted in a 1l autoclave with stirring at 300 rpm. at 180° C. under autogenous pressure, until the zeolite crystallised. Stirring was increased to 400 rpm (i.e., an increase in the stirring rate of the order of 34% with respect to the initial rate) for 10 h, to adjust the granulometry of the aggregates. After cooling, the product was filtered and washed with 3.5 liters of demineralised water then dried in a ventilated oven at 120° C.

The results of X ray diffraction and chemical analysis are shown in following table:

| Example | 3 (invention) | 4 (invention) | 5 (invention) | 6 (invention) |
|---|---|---|---|---|
| Template | $OctaBr_2$ | $OctaBr_2$ | DBO + TMA | DBO + TBA |
| Seeds (%) | 0 | 4 | 0 | 4 |
| Time (d) | 12.0 | 9.8 | 11.3 | 9.2 |
| ZSM-23[1] (%) | 99 | 101 | 100 | 101 |
| Si/Al[2] (mol/mol) | 18.9 | 18.7 | 18.6 | 18.8 |
| Production[5] (%) | 4.7 | 4.8 | 4.9 | 4.6 |
| Size[3] (nm) | 20–100 | 20–100 | 20–100 | 20–100 |
| $D_{v90}$[4] (μm) | 37 | 35 | 39 | 36 |

[1]Determined by X ray diffraction
[2]Determined by X ray fluorescence
[3]Determined by the Scherrer relationship from the peak width between $2\theta$ = 7 to 35°
[4]Determined by laser diffraction granulometry
[5]Production (%) corresponds to the mass of dried solid recovered following synthesis, with respect to the total mass used initially in the gel.

The zeolites obtained had optimum crystallinity and production (more than 99% and 4.6% respectively), a Si/Al ratio in the range 18.6 to 18.9. Each zeolite was in the form of 20 to 100 nm crystallites associated into crystal aggregates such that Dv,90 was less than 40 μm.

EXAMPLE 7
Preparations of ZSM-23 Zeolites with Structure Type MTT in the Hydrogen Form The ZSM-23 zeolites prepared in Examples 1, 2 and 3 underwent a suite of treatments with the aim of producing the hydrogen form, also termed the acid form. This treatment sequence, identical for the three zeolites from Examples 1, 2 and 3, was as follows: each synthesised zeolite was calcined in dry air for 12 h at 550° C. then underwent three successive ion exchange steps using an ammonium nitrate solution to obtain the $NH_4^-$ form of the zeolite To this end, 10 grams of each calcined ZSM-23 zeolite was suspended in 100 ml of an ammonium nitrate molar solution (5M) then stirred under reflux for 2 hours The solid was then filtered and washed. This treatment cycle was repeated two more times. The solid obtained was then dried at 60° C. for 10 hours and calcined at 500° C. for 4 hours in a stream of dry air to obtain the hydrogen form.

The characteristics of the zeolites after these treatments were as follows:

| ZSM-23 used | ZSM-23/1 ZSM-23 from Example 1 Not in accordance | ZSM-23/2 ZSM-23 from Example 2 In accordance | ZSM-23/3 ZSM-23 from Example 3 In accordance |
|---|---|---|---|
| Na content (ppm by weight) | 18 | 15 | 23 |
| Overall Si/Al* | 19.1 | 19.1 | 19.2 |

*Determined by X ray fluorescence.

EXAMPLE 8
Preparation of Catalysts C1, C2 and C3

The zeolites prepared in Example 7 then mixed with an alumina gel. The mixed paste was extruded through a 1.4 mm diameter die. The amount of ZSM-23 zeolite with structure type MTT in the support (zeolite+matrix) was 80% by weight.

An aqueous solution of a platinum salt $Pt(NH_3)_4Cl_2$ was deposited by dry impregnation to produce a platinum content on the support of about 0.5% The catalysts obtained were termed C1 in the case of the formed ZSM-23/1 zeolite, C2 in the case of the ZSM-23/2 zeolite and C3 in the case of the ZSM-23/3 zeolite. The platinum dispersion was measured by $H_2/O_2$ titration after calcining at 450° C. in dry air and reduction in hydrogen at 420° C.

| ZSM-23 catalyst used | C1 ZSM-23/1 Not in accordance | C2 ZSM-23/2 In accordance | C3 ZSM-23/3 In accordance |
|---|---|---|---|
| Pt content (% by weight) | 0.48 | 0.49 | 0.46 |
| Pt dispersion (%) | 42 | 45 | 40 |

EXAMPLE 9
Catalytic Evaluation of Catalysts C1, C2 and C3 by Hydroisomerisation of n-heptane.

Prior to their catalytic evaluation, catalysts C1, C2 and C3 were calcined at 450° C. in dry air for 4 hours. The temperature rise was carried out at a rate of 5° C./minute with two constant temperature stages lasting one hour at 150° C. and 300° C.

The metallic phase was reduced in situ in the catalytic reactor just before the catalytic test was carried out.

The reduction conditions for the three catalysts were as follows:
- temperature rise at 7° C./minute up to 150° C. in a stream of hydrogen, constant temperature stage of 30 minutes,
- then raising the temperature, again at 7° C./minute, up to 300° C. in a stream of hydrogen, constant temperature stage of 30 minutes,
- finally, raising the temperature at 7° C./minute up to 450° C. in a stream of hydrogen, constant temperature stage of 60 minutes.

The temperature was then reduced to the reaction temperature, namely 235° C. The catalytic tests were carried out in a fixed bed reactor in the gas phase. The molecule isomerised (hydroisomerised) in the presence of hydrogen was n-heptane (99.9% pure) and the mole ratio used in the various catalytic tests of the hydrogen to the n-heptane was 3. The space velocity, i.e., the mass of n-heptane injected per gram of catalyst per hour, was 2.1 $h^{-1}$.

The products formed were either $C_1$ to $C_6$ cracking products or products containing 7 carbon atoms per molecule, n-heptane isomers or aromatic products from n-heptane aromatisation reactions.

The catalytic results obtained are shown in the following table:

| % by weight | C1 | C2 | C3 |
|---|---|---|---|
| n-$C_7$ conversion | 67 | 75 | 82 |
| Yield of $C_1$-$C_6$ cracking products | 19 | 15 | 11 |
| Isomerisation yield | 48 | 60 | 71 |

This table shows that using a catalyst comprising ZSM-23 zeolite of the invention (catalysts C2 and C3) can effect n-heptaptane hydroisomerisation in a manner that is more selective for isomerisation products and with a better activity. Conversions obtained under identical operating conditions are higher indeed.

What is claimed is:

1. A zeolite with structure type MTT comprising MTT zeolite crystals with a size of less than 5 μm, at least a portion of the MTT zeolite crystals being in the form of MTT zeolite aggregates, said aggregates having a granulometry such that the dimension Dv,90 is in the range 40 nm to 100 μm.

2. A zeolite according to claim 1, characterized in that the Dv,90 for the aggregates is in the range 40 nm to 80 μm.

3. A zeolite according to claim 1, characterized in that the Dv,90 for the aggregates is in the range 40 nm to 60 μm.

4. A zeolite according to claim 1, characterized in that the Dv,90 of the aggregates is in the range 40 nm to 40 μm.

5. A zeolite according to claim 1, characterized in that the size of the zeolite crystals is less than 0.5 μm.

6. A zeolite according to claim 1, characterized in that the size of the zeolite crystals is less than 0.2 μm.

7. A zeolite according to claim 1, characterized in that it comprises at least an element X selected from silica and germanium and at least one element T selected from aluminium, iron, gallium, boron, titanium, vanadium, zirconium, molybdenum, arsenic, antimony, chromium and manganese, the overall atomic ratio X/T being 5 or more.

8. A zeolite according to claim 7, characterized in that element X is silicon and element T is aluminium.

9. A zeolite according to claim 1, characterized in that the zeolite is ZSM-23 zeolite.

10. A process for preparing a zeolite according to claim 1, characterized in that it comprises reacting an aqueous mixture with at least one source of at least one element X, at least one source of at least one element T, and at least one source of an organic nitrogen—containing compound Q selected from alkylated polymethylene α-ω diammonium derivatives and precursors of said derivatives.

11. A process according to claim 10, characterized in that the aqueous mixture is stirred by applying at least two substantially different successive stirring rates.

12. A process according to claim 11, characterized in that the second stirring rate is substantially higher than the first stirring rate.

13. A process according to claim 10, characterized in that it comprises introducing seeds S of at least one zeolite into the aqueous mixture.

14. A process according to claim 13, characterized in that the zeolite seeds are introduced after at least partial homogenization of the aqueous mixture containing the source of element X, the source of element T and the source of an organic nitrogen-containing compound.

15. A process according to claim 10, characterized in that the organic nitrogen-containing compound Q is selected from alkylated polymethylene α-ω diammonium derivatives defined by the formula: $R_1R_2R_3N^+(CH_2)_nN^{3\oplus}R_4R_5R_6$, n being in the range 3 to 14 and $R_1$ to $R_6$, which may be identical or different, representing alkyl or hydroxyalkyl radicals containing 1 to 8 carbon atoms; up to five $R_1$ to $R_1$ radicals can be hydrogen.

16. A process according to claim 10, characterized in that it comprises introducing at least one alkali metal and/or ammonium salt P.

17. A process according to claim 10, characterized in that the aqueous mixture has the following composition:

| | |
|---|---|
| $XO_2/T_2O_3$ (mol/mol) | at least 10 |
| $OH/XO_2$ (mol/mol) | 0.002 to 2.0 |
| $Q/XO_2$ (mol/mol) | 0.002 to 2.0 |
| $Q/(M^+ + Q)$ (mol/mol) | 0.1 to 1.0 |
| $H_2O/XO_2$ (mol/mol) | 1 to 500 |
| $P/XO_2$ (mol/mol) | 0 to 5 |
| $S/XO_2$ (g/g) | 0 to 0.1. |

18. A catalyst comprising an MTT zeolite prepared according to the process of claim 10.

19. A process for preparing a zeolite according to claim 1, characterized in that an as synthesised zeolite with a Dv,90 for the aggregates of more than 100 μm is ground.

20. A catalyst comprising an MTT zeolite according to claim 1.

21. A catalyst according to claim 20, characterized in that it comprises at least one binder and at least one metal group VIII of the periodic table.

22. A catalyst according to claim 20, characterized in that the zeolite is at least partially in its acid form.

23. A process for isomerising straight chain paraffins containing 5 to 10 carbon atoms per molecule carried out in the presence of a catalyst according to claim 20, said process being characterized in that it is carried out at a temperature in the range 150° C. to 350° C., limits included, at a partial pressure of hydrogen in the range 0.1 to 7 MPa, limits included, with a space velocity in the range 0.2 to 10 litres of liquid hydrocarbon per litre of catalyst per hour, with a hydrogen/feed mole ratio at the inlet to the reactor such that the hydrogen/feed mole ratio in the effluent leaving the reactor is generally more than 0.01.

24. In a process comprising hydroisomerizing a linear hydrocarbon of 5–10 carbon atoms in the presence of a catalyst, the improvement wherein the catalyst is according to claim 20.

* * * * *

UNITED STATES PATENT AND TRADEMARK OFFICE
CERTIFICATE OF CORRECTION

PATENT NO. : 6,692,723 B2
DATED : February 17, 2004
INVENTOR(S) : Rouleau et al.

It is certified that error appears in the above-identified patent and that said Letters Patent is hereby corrected as shown below:

Column 13,
Line 23, "$N^{30}$" should be -- $N^+$ --.
Line 26, "$R_1$" should be -- $R_i$ --. (second occurrence)

Signed and Sealed this

Twenty-second Day of March, 2005

JON W. DUDAS
*Director of the United States Patent and Trademark Office*